US012680384B2

(12) United States Patent
Rezaei

(10) Patent No.: US 12,680,384 B2
(45) Date of Patent: Jul. 14, 2026

(54) HYDRAULIC MOTOR

(71) Applicant: Ali Rezaei, Calgary (CA)

(72) Inventor: Ali Rezaei, Calgary (CA)

( * ) Notice: Subject to any disclaimer, the term of this patent is extended or adjusted under 35 U.S.C. 154(b) by 0 days.

(21) Appl. No.: 18/428,807

(22) Filed: Jan. 31, 2024

(65) Prior Publication Data

US 2024/0254834 A1 Aug. 1, 2024

Related U.S. Application Data

(60) Provisional application No. 63/482,494, filed on Jan. 31, 2023.

(51) Int. Cl.

| | |
|---|---|
| ***E21B 4/02*** | (2006.01) |
| ***E21B 4/00*** | (2006.01) |
| ***F01C 21/08*** | (2006.01) |
| ***F03B 13/02*** | (2006.01) |

(52) U.S. Cl.

CPC ................ *E21B 4/02* (2013.01); *E21B 4/003* (2013.01); *F01C 21/08* (2013.01); *F01C 21/0809* (2013.01); *F03B 13/02* (2013.01)

(58) Field of Classification Search

CPC .. E21B 4/003; E21B 4/02; F01C 21/08; F01C 21/0809; F03B 13/02

See application file for complete search history.

(56) References Cited

U.S. PATENT DOCUMENTS

| | | | | |
|---|---|---|---|---|
| 546,663 | A * | 9/1895 | Haskins | F04D 29/225 416/243 |
| 1,581,465 | A * | 4/1926 | Morton | E21B 4/02 415/224 |
| 3,076,514 | A * | 2/1963 | Garrison | E21B 4/02 415/141 |
| 4,560,014 | A * | 12/1985 | Geczy | F16C 33/26 384/123 |
| 6,527,513 | B1 * | 3/2003 | Van Drentham-Susman | E21B 4/02 415/903 |

FOREIGN PATENT DOCUMENTS

| | | | | |
|---|---|---|---|---|
| GB | 2292186 | A * | 2/1996 | F01C 21/0809 |

* cited by examiner

*Primary Examiner* — Elton K Wong
(74) *Attorney, Agent, or Firm* — Bennett Jones LLP

(57) ABSTRACT

A hydraulic motor includes a top sub for connecting to a tubing string, a main barrel and a bottom bit sub; an impeller housing connected to the top sub and disposed within the main barrel, the impeller housing defining an annular intake plenum and at least one inlet port for directing fluid in a direction substantially transverse to a longitudinal axis of the motor, and at least one exhaust port for exhausting fluid from the impeller housing into an annular exhaust plenum; an impeller disposed within the impeller housing, connected to an impeller shaft, the impeller comprising a hub bearing a plurality of outwardly extending vanes, wherein fluid directed onto the impeller through the at least one inlet port causes rotation of the impeller; and a bottom bearing assembly for supporting an adapter shaft disposed within the bit sub.

9 Claims, 12 Drawing Sheets

HYDRAULIC MOTOR

FIELD OF THE INVENTION

The present invention generally relates to a hydraulic motor, particularly for use downhole as a mud motor.

BACKGROUND OF THE INVENTION

Mud motors are well known for drilling subterranean wellbores to produce oil and gas. They are conventionally progressive cavity motors having an elastomer lined stator and an internal rotor. Mud motors suffer from various disadvantages, including a relatively low torque and speed capability, susceptibility to chemical and heat degradation, and a lack of longitudinal rigidity.

Accordingly, there is a need in the art for an improved hydraulic motor, suitable for use in drilling subterranean wellbores through the earth.

SUMMARY OF THE INVENTION

In one aspect, disclosed is a hydraulic motor, comprising:

(a) a top sub for connecting to a tubing string, a main barrel and a bottom bit sub;

(b) an impeller housing connected to the top sub and disposed within the main barrel, the impeller housing defining an annular intake plenum and at least one inlet port for redirecting fluid in a direction substantially transverse to a longitudinal axis of the motor, and at least one exhaust port opening for exhausting fluid from the impeller housing into an annular exhaust plenum; and (c) an impeller disposed within the impeller housing, connected to an impeller shaft, the impeller comprising a hub bearing a plurality of outwardly extending vanes, wherein fluid directed onto the impeller through the at least one inlet port causes rotation of the impeller;

wherein the motor defines a fluid path through the top sub, through the impeller housing and through an annular space within the main barrel, and which exits through the bit sub.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIGS. 8A-8F show an alternative embodiment of an impeller housing, wherein FIG. 8E is a longitudinal cross-section along line A-A of FIG. 8B, and FIG. 8F is a transverse cross-section along line B-B in FIG. 8C.

FIG. 10C is a cross-sectional view along line B-B of FIG. 10B. FIG. 10D is a cross-sectional view along line A-A of FIG. 10A.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Any term or expression not expressly defined herein shall have its commonly accepted definition understood by a person skilled in the art.

Figure 1:
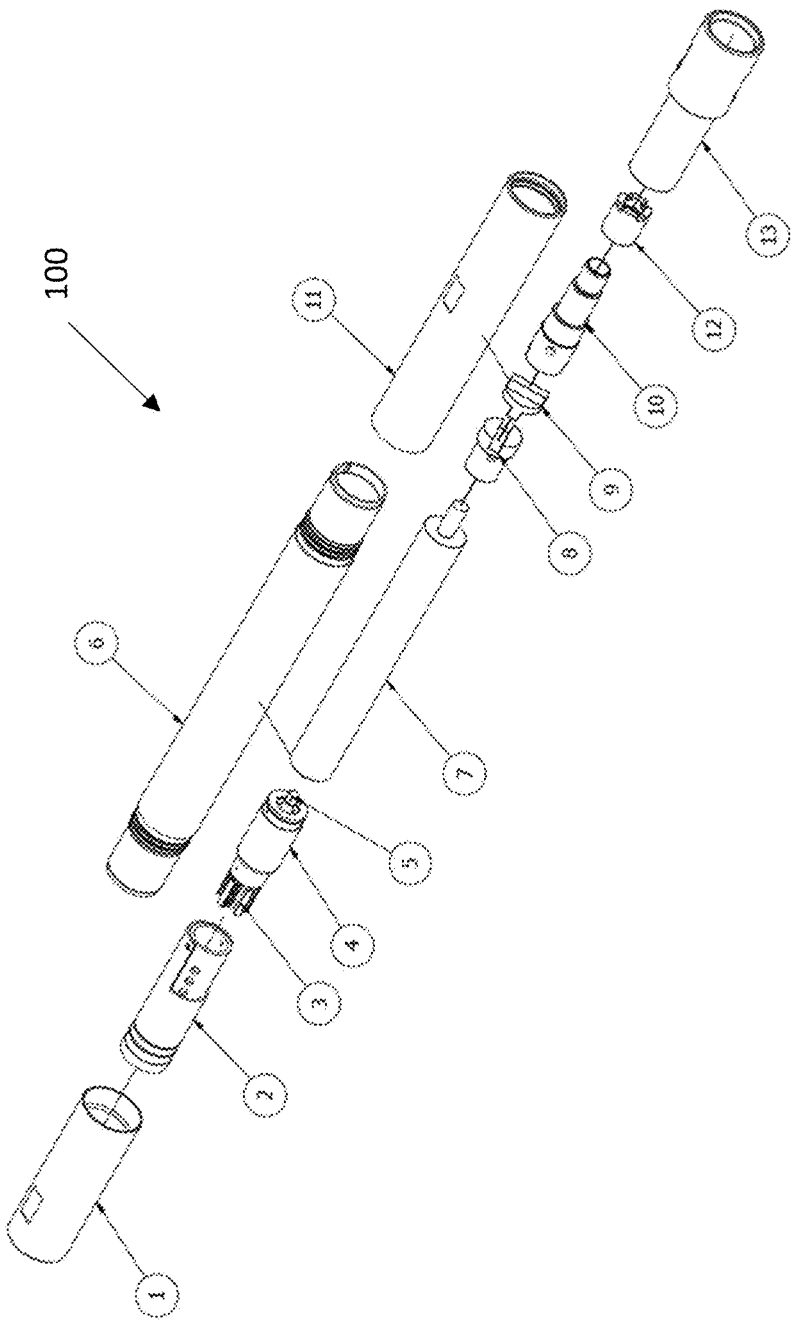
FIG. 1 is a partial exploded view of one embodiment of a hydraulic motor as described herein.
Figure 2:
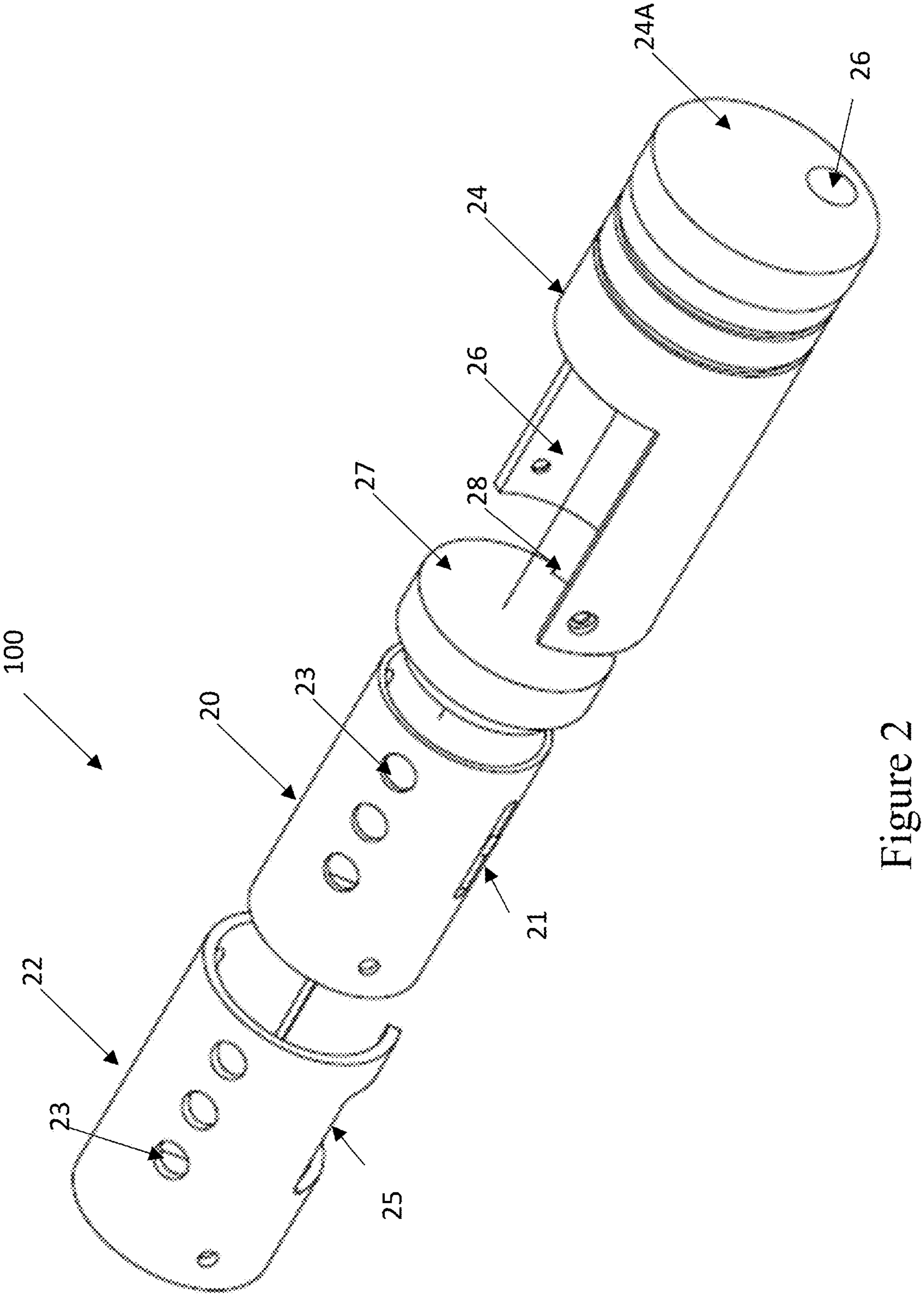
FIG. 2 is an isometric view of an impeller housing of the embodiment of FIG. 1.
Figure 3A:
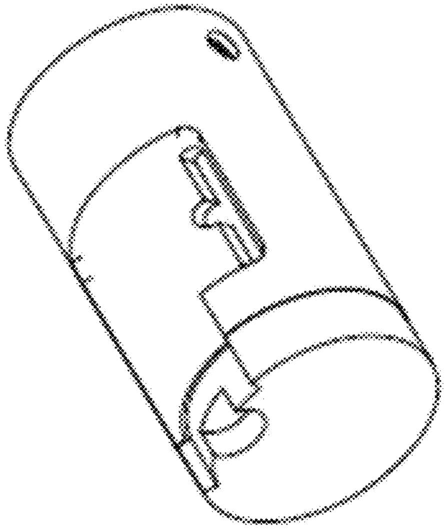
FIG. 3A is a partial cutaway isometric view of the inner impeller housing and the intermediate housing.
Figure 3B:
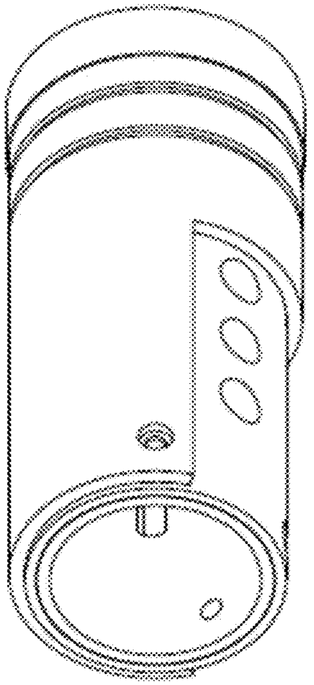
FIG. 3B is a partial cutaway isometric view of the three layers of the impeller housing.
Figure 3C:
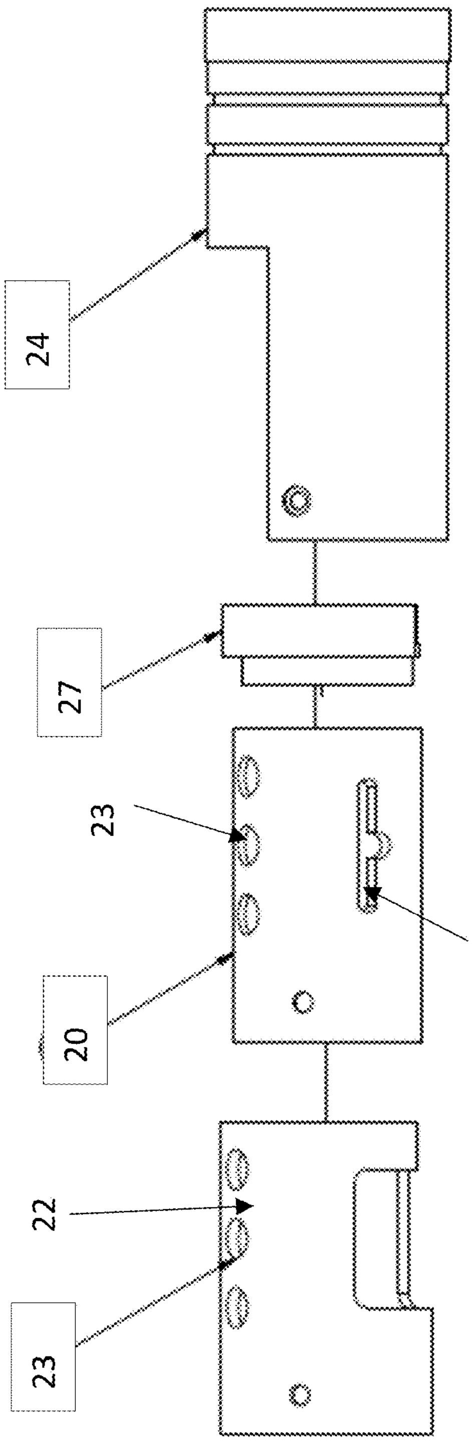
FIG. 3C is a side plan view of the view of FIG. 2.
Figure 3D:
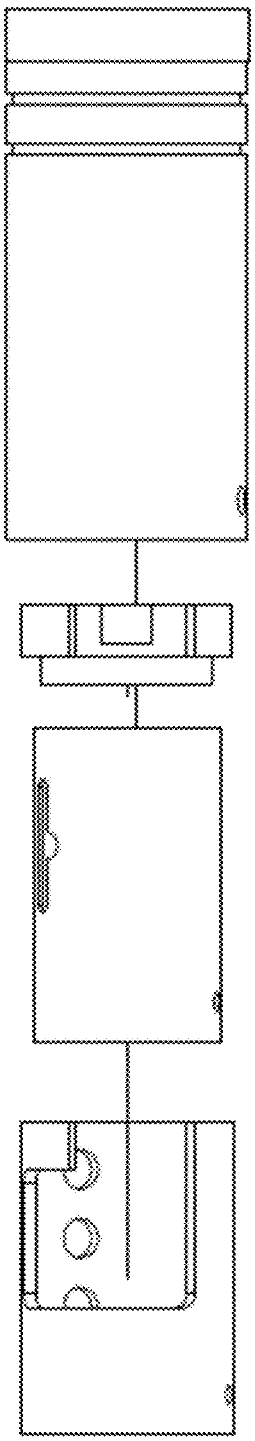
FIG. 3D is a bottom plan view of FIG. 2.

The motor described herein does not rely on pressure differentials in the same manner as a progressive cavity motor, but instead relies on fluid momentum created by fluid velocity. With reference to FIG. 1, one embodiment of a hydraulic motor 100 may comprise:

(a) a top sub 1 for connecting to a tubing string (not shown);

(b) an impeller housing 2 connected to the top sub 1 and an impeller 3 disposed within the impeller housing, connected to an impeller shaft 5;

(c) a bearing assembly 4 supporting the impeller shaft 5;

(d) a gearbox or speed reducer 7, (e) a main barrel housing 6; and (f) a bottom assembly comprising a motor adapter 8, mid coupling 9, adapter shaft 10, bearing box casing 11, nut bearing box 12 and bit sub 13.

As a mud motor, drilling fluid passes through the motor under pressure and is used to create rotational energy through the impeller 3. The impeller 3 comprises a hub 30 keyed to the impeller shaft 5 and which bears a plurality of outwardly extending vanes 32, which are preferably non-helical.

The impeller housing 2 defines at least one inlet port 21 for directing fluid onto the impeller vanes 32 in a direction substantially transverse to a longitudinal axis of the motor. The substantially transverse direction may be at least 60, 70, 80, or 85 degrees from longitudinal axis, and is preferably about 90 degrees.

In some embodiments, the impeller housing 2 comprises an inner housing 20 enclosing an impeller chamber, an intermediate housing 22, and an outer housing 24, which are layered concentrically. The inner housing 22 defines at least one inlet port 21 and at least one exhaust port 23. The intermediate housing defines a cutaway which defines an annular intake plenum 25 between the inner housing and the outer housing. The outer housing defines a cutaway which defines an annular exhaust plenum 26 disposed between the intermediate housing 22 and the main barrel 6.

The outer housing 24 comprises an uphole end plate 24A which directs fluid flow through an opening 26. A cap plate 27 defines an edge gap 28 which aligns with the intake plenum 25 when assembled, which is an annular space between the inner surface of the outer housing and the outer surface of the inner housing.

Thus, fluid which is directed through openings 26 and 27 into the intake plenum 25, is redirected through inlet port 21 into the impeller chamber. The fluid is redirected in a direction substantially transverse to the longitudinal axis of the motor. In some embodiments, the inlet port 21 is elongated in a longitudinal direction. Preferably, the sidewalls of the inlet port 21 are angled to direct fluid tangentially into the impeller chamber. A portion 21A of the port 21 may be enlarged in a lateral direction to assist in rotating the impeller from a standstill, which may be of benefit when an impeller end portion 34 is in a position covering the inlet port.

The impeller 3 comprises a hub 30 bearing a plurality of outwardly extending, longitudinally oriented vanes 32. The vanes 32 are preferably non-helical. The hub 30 is internally notched to be keyed to the impeller shaft 5. In some embodiments, the vanes 32 comprise an extended portion forming an end scoop 34, which forms a "bucket" functioning to increase the energy transfer of fluid which impacts the vane.

Figure 6:
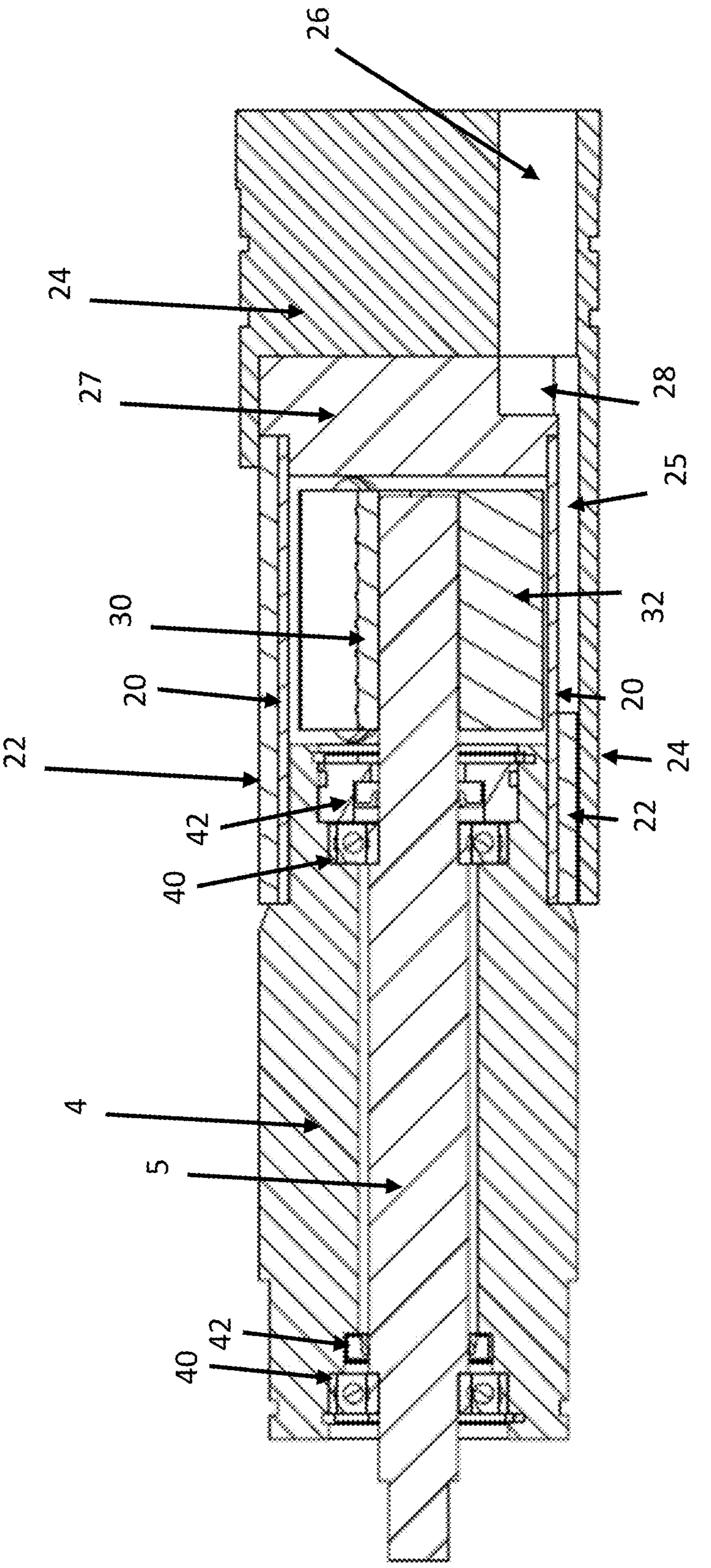
FIG. 6 is a longitudinal cross-section of the embodiment of FIG. 5.

In some embodiments, the impeller vanes 32 are not sealed within the impeller volume—gaps at the upper and lower ends of the impeller are provided and a gap exists between the end scoops 34 and an inner surface of the impeller housing, as may be seen in FIG. 6.

In some embodiments, each impeller vane 32 is supported physically by a plurality of gussets 36, which are preferably positioned opposite the side of the vane 32 which is directly impacted by the incoming fluid flow.

Figure 4B:
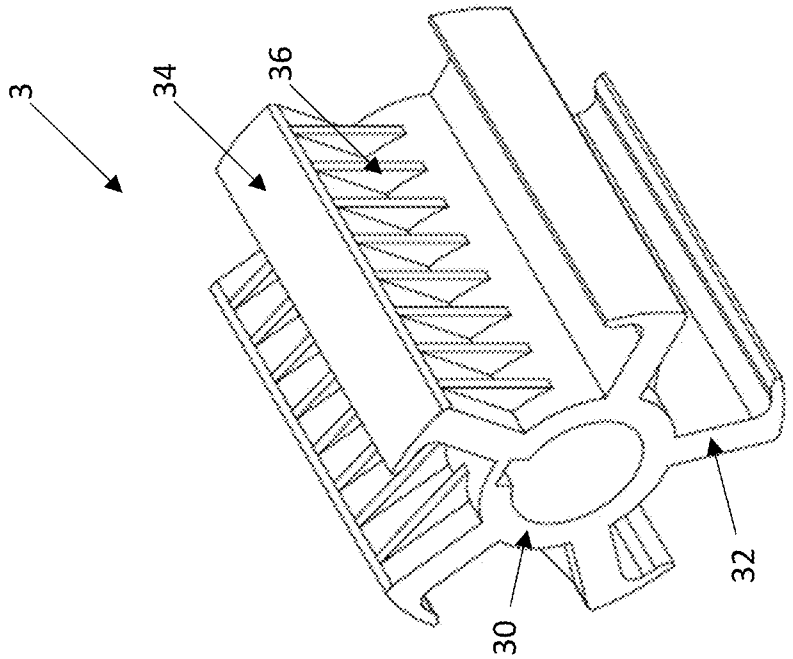
FIG. 4B is an isometric view of the impeller shown in FIG. 4A.
Figure 4A:
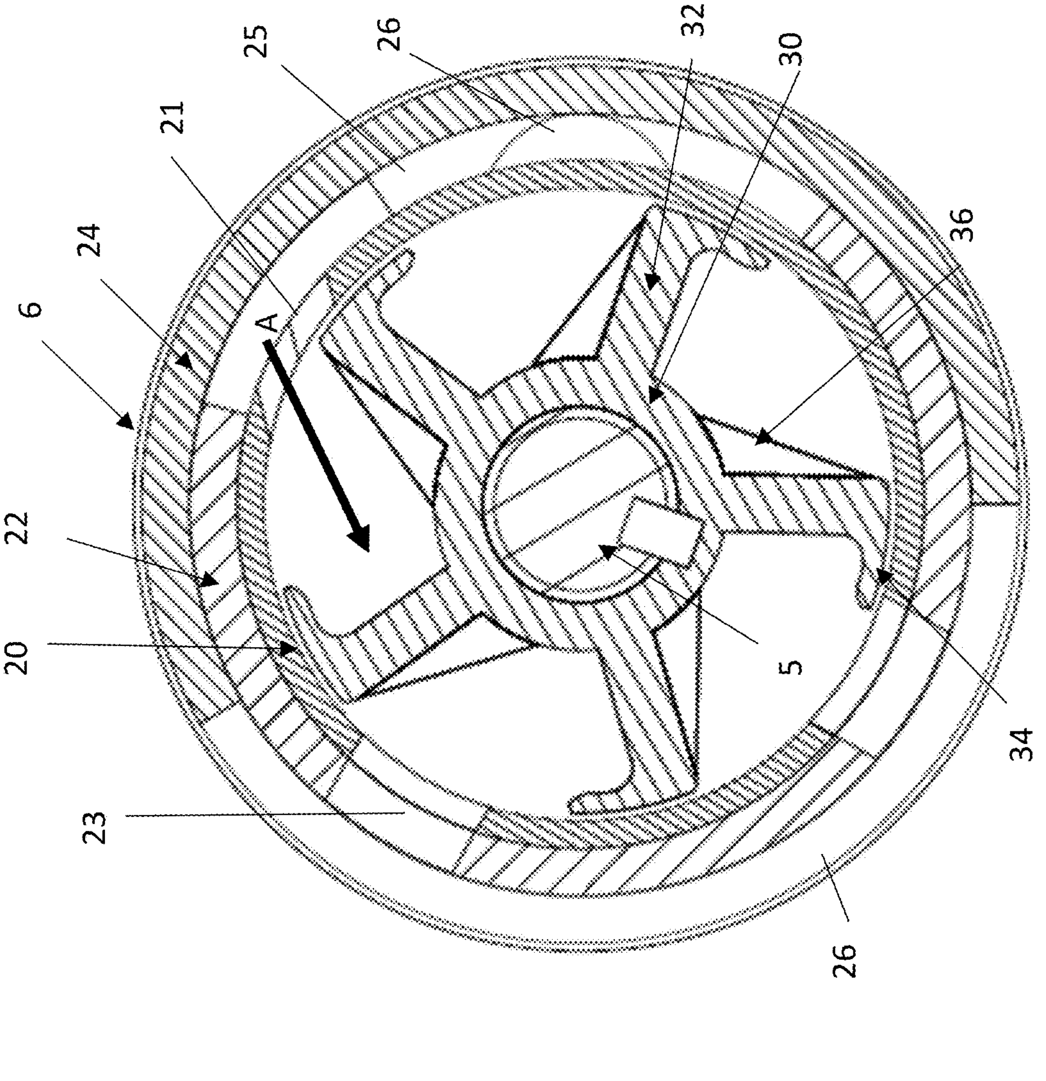
FIG. 4A is a transverse cross-sectional view of the motor, showing a cross-section of an impeller within the impeller housing.
Figure 5:
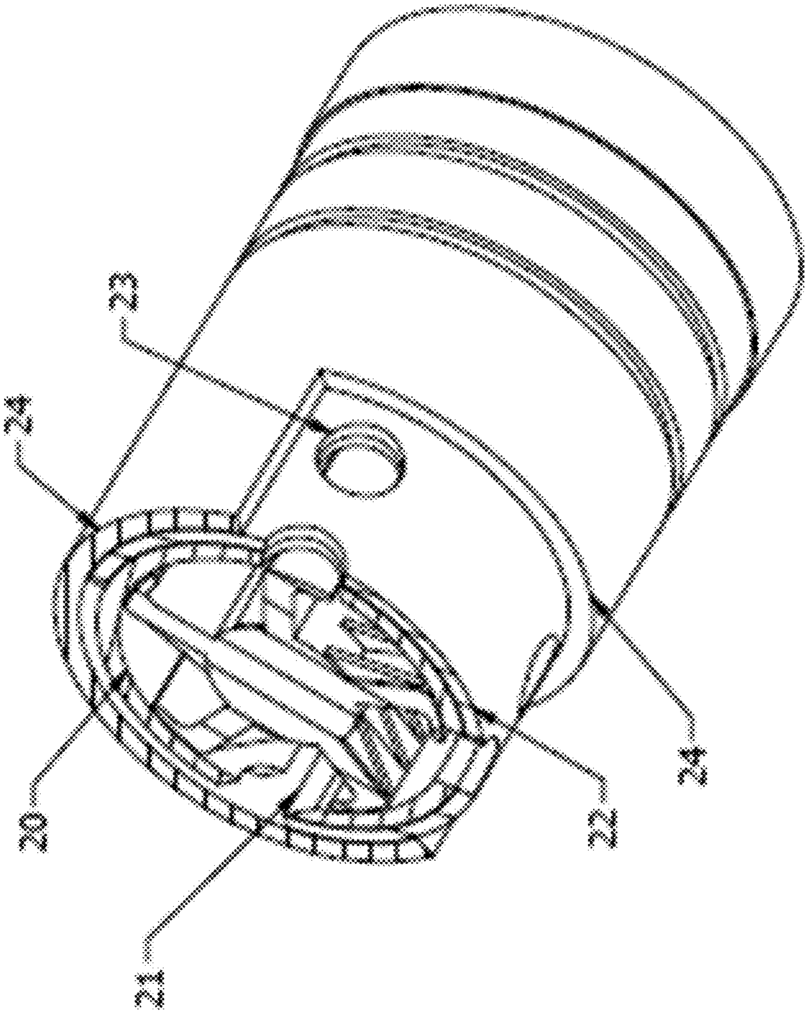
FIG. 5 is an isometric cutaway view of an assembled impeller housing and impeller.

Fluid which is pumped downhole through a tubing string is partially blocked by end plate 24A and forced into opening 26. Fluid velocity greatly increases due to the restriction of the fluid flow. This fast moving fluid is then directed onto the impeller vanes with shaped inlet port 21, as shown by arrow A in FIG. 4A. The impeller is not sealed at either end, and fluid may then flow out of the impeller chamber at either end. The energy of the high velocity fluid impacts the vane and causes rotation of the impeller. The fluid within the impeller housing will rotate with the impeller, providing inertia to the movement of the impeller.

Fluid exit ports 23 are provided in the inner and intermediate housings 20, 22, and lead to the exhaust plenum defined by a cutaway in the outer housing 24, between the intermediate housing and the main barrel 6. Fluid continues in the annular space within the main barrel 6 and speed reducer or gearbox 7, past the motor adapter 8 and mid coupling 9, and then enters through ports into the adapter shaft 10, and then passes out through the of bearing box casing 11, nut bearing box 12, and finally the bit sub 13.

The impeller shaft 5 is supported by bearings 40 in the bearing assembly 4. Seals 42 ensure that drilling fluid and debris do not enter the bearing assembly.

Torque is transmitted from the impeller shaft 5 through the gearbox/speed reducer 7, which connects to the bit sub 13 with a motor adapter 8 and mid coupling 9, and adapter shaft 10, which is attached to inside of the bit sub 13 with the nut bearing box 12. The rotating components of the bottom assembly may be supported by conventional thrust and rotary bearings (not shown).

Figure 7A:
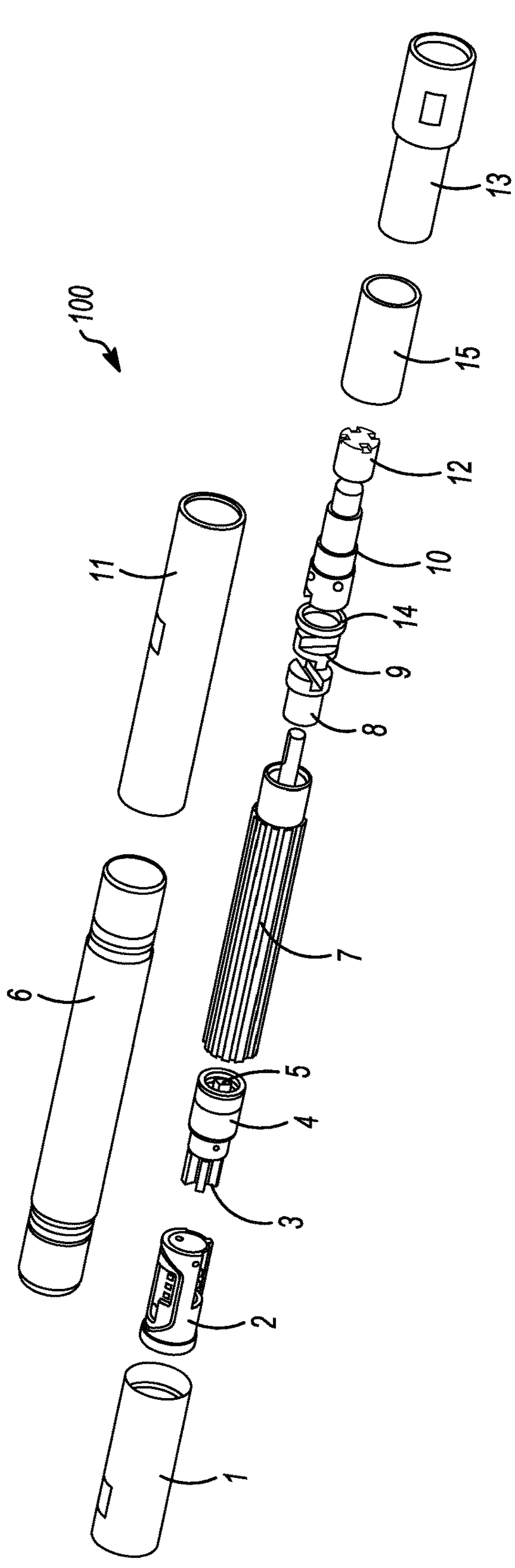
FIG. 7A shows an alternative embodiment in exploded view and FIG. 7B shows a longitudinal cross-section of the embodiment of FIG. 7A.
Figure 7B:
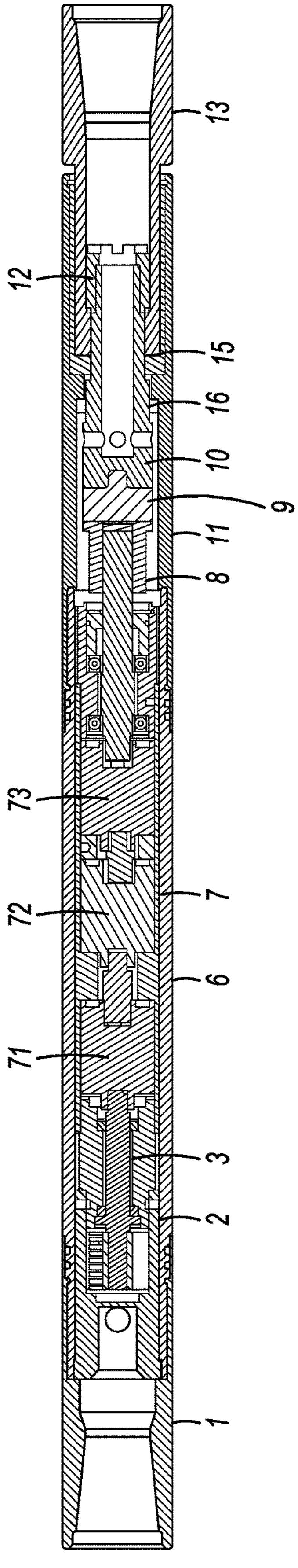

In some alternative embodiments, the motor 100 may comprise one or more of the elements of an alternative configuration as described below and illustrated in FIGS. 7-11. FIG. 7A shows one alternative embodiment, while FIG. 7B shows a longitudinal cross-section of the embodiment of FIG. 7A.

Figure 8A:
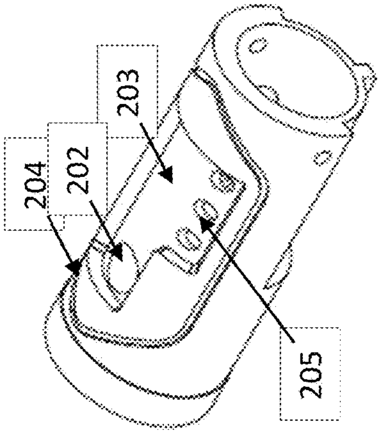
Figure 8E:
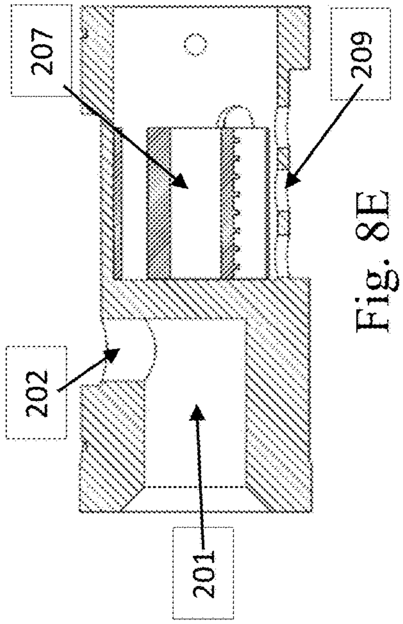
Figure 8B:
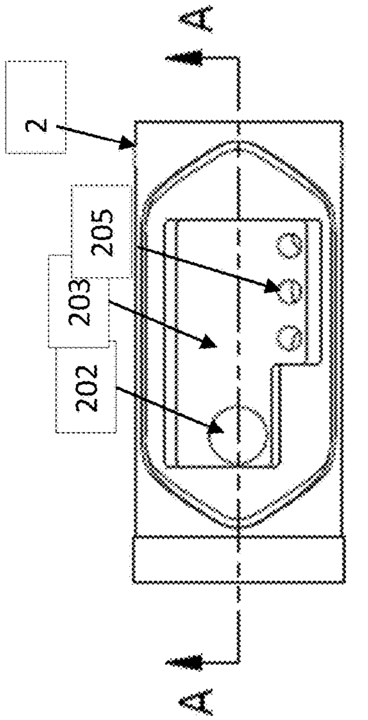
Figure 8C:
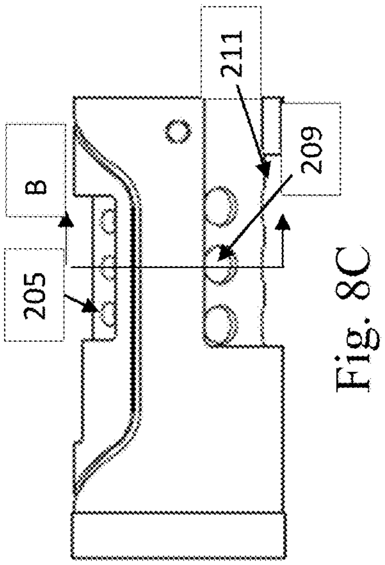
Figure 8D:
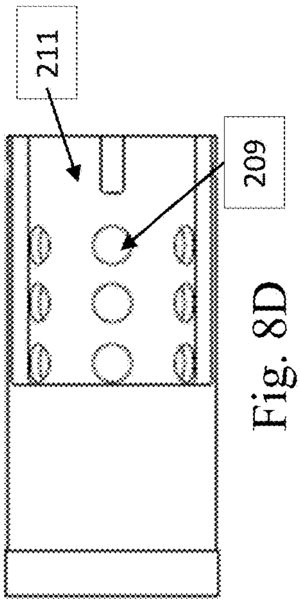
Figure 8F:
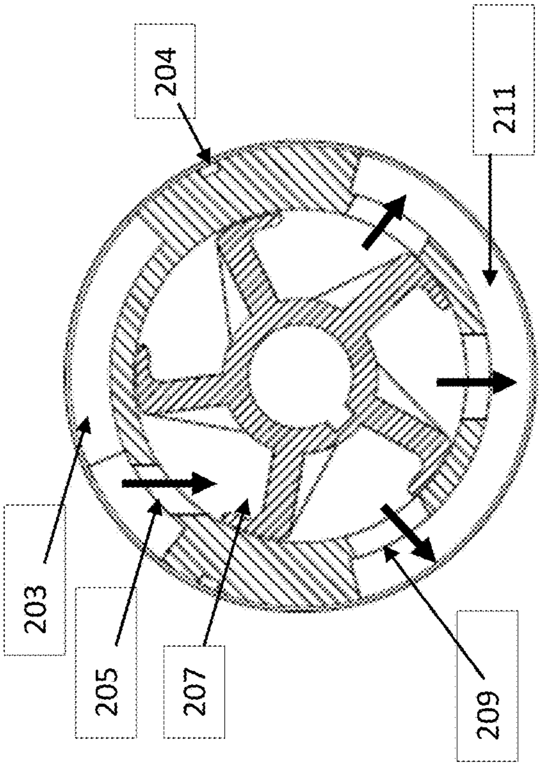
Figure 9C:
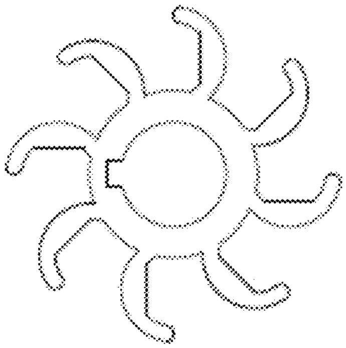
FIGS. 9A, 9B and 9C show transverse cross-sections of alternative configurations of impeller vanes.
Figure 9B:
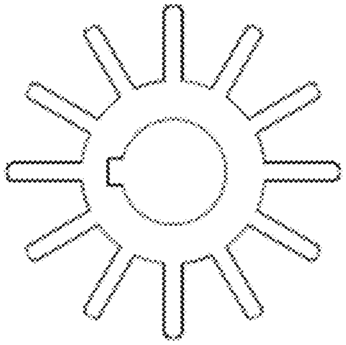
Figure 9A:
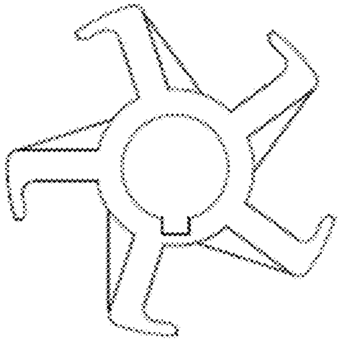
Figure 10D:
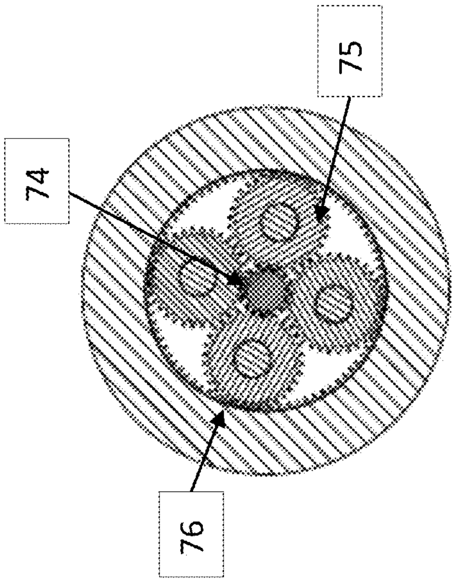
FIGS. 10A-10D show various views of one embodiment of a speed reducing gear set.
Figure 10C:
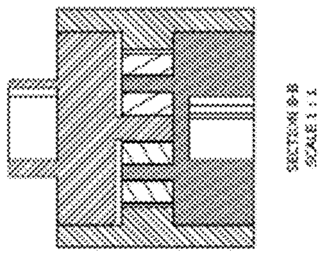
Figure 10B:
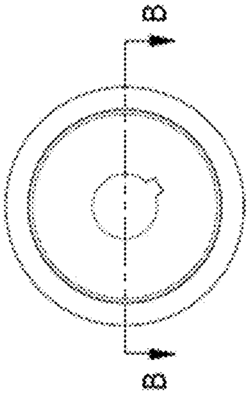
Figure 10A:
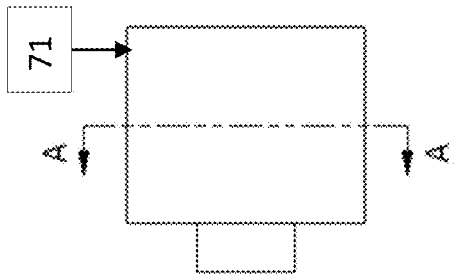

In an alternative embodiment, the impeller housing 2 may comprise a unitary element instead of a layered concentric construction. The housing 2 defines a central intake chamber 201 at the uphole end with an enlarged single transfer port 202 which feeds the intake plenum 203 formed between the impeller housing 2 and the main barrel 6, by a cutaway in the impeller housing 2. A perimeter seal, such as an O-ring seal 204, is required to seal the intake plenum 203 within the main barrel 6. At least one, and preferably two or three intake ports 205 then feeds fluid in a substantially transverse direction into the impeller chamber 207 at high velocity. A plurality of exhaust ports 209 then drain fluid from the impeller chamber 207. In one embodiment, nine exhaust ports are arranged in three rows of three ports. In one embodiment, this arrangement ensures that exhaust ports 209 are arranged to align with each impeller vane, as illustrated in FIG. 8F. The exhaust plenum 211 is formed between the impeller housing 2 and the main barrel 6, by a cutaway in the impeller housing 2.

Thus, fluid is directed through the top sub and centrally into the central intake chamber 201, and follows the transfer port 202 into the intake plenum 203, is redirected through inlet ports 205 into the impeller chamber. The fluid is redirected in a direction substantially transverse to the longitudinal axis of the motor.

In some embodiments, the inlet ports 205 are arranged in a row of three relatively smaller openings, to increase the velocity of the fluid which impacts the impeller vanes. Preferably, the sidewalls of the inlet ports are angled so as to direct fluid tangentially into the impeller volume, as shown by arrow B in FIG. 8F.

In some embodiments, the combined area of the at least one exhaust port openings from the impeller housing exceeds the combined area of the at least one inlet port openings. A larger number of exhaust ports may be provided, such as three rows of three exhaust ports, as shown in FIG. 8D. The exhaust ports 209 may also be larger than the inlet ports 205. As a result, the fluid then exhausts through the exhaust ports 209 at a lower velocity and pressure.

In some embodiments, the configuration of the impeller vanes 32 may be varied to accommodate different design objectives, such as higher or lower speed and higher or lower torque requirements. In one embodiment, the number of vanes may be increased, which may eliminate the need for reinforcing gussets. The vanes may be straight planar members, or may comprise a curved or scooped design, as may be seen in FIG. 9C.

In some embodiments, the speed reducer 7 may comprise three serial planetary gear sets 71, 72, 73 which reduce the revolutionary speed and increase the torque produced by the impeller 3. In one embodiment, each gear set provides about a 3:1 or 4:1 speed reduction. Each gear set has an input central gear 74 which rotates planetary gears 75 and an output gear 76, as shown in FIGS. 10A-D.

At the bit sub 13 end, the adapter shaft 10 is connected to a nut bearing box 12, which connect to and rotates the bit sub 13. The adapter shaft 10 defines passageways which allow the drilling fluid passing in the annular space within the main barrel 6 to move to the central passageway of the bit sub 13.

Figure 11:
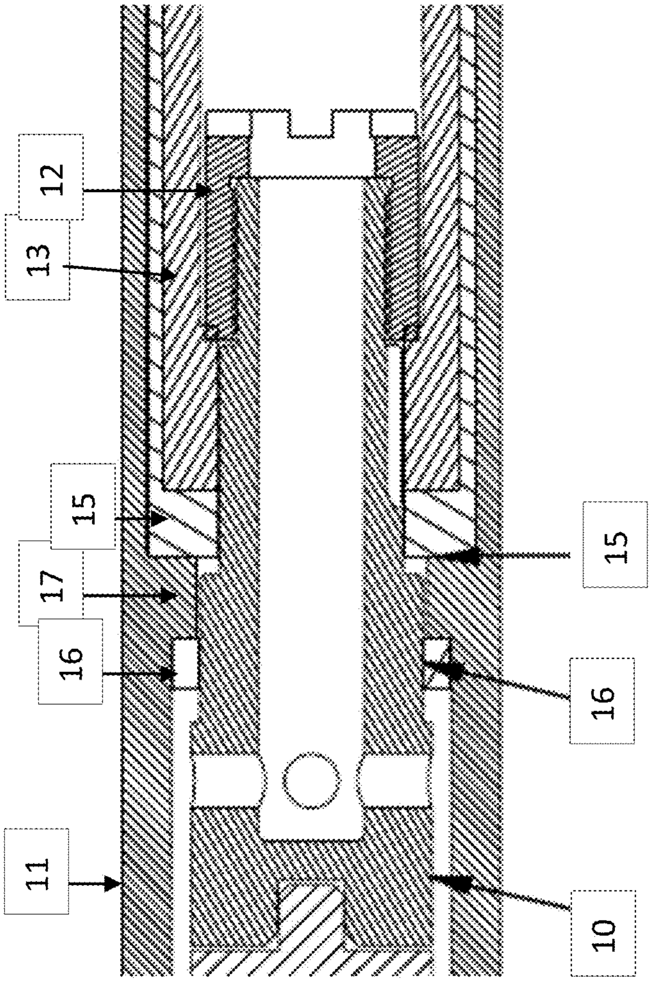
FIG. 11 shows a detail of FIG. 7B, showing one embodiment of the bottom bearing and bit sub.

In some embodiments, the rotating assembly of the adapter shaft 10, the nut bearing box 12 and bit sub 13 rotate within and is supported by solid, dry-running bearings 15 and 16, which act as both thrust and rotary bearings, illustrated in detail in FIG. 11. The solid, dry-running bearing comprises a first thrust bearing ring 16 for supporting an upper portion of the adapter shaft 10, and a second thrust/rotary bearing 15 for supporting a lower portion of the adapter shaft and the bit sub 13. The two bearings 15, 16 maybear on and be separated by an internal shoulder 17.

The bearings 15, 16 may be formed of a suitably durable and dry running bearing material, such as a polyetheretherketone (PEEK) material, as is known in the art. Other thermoplastic polymers which offer suitable friction reduction, rigidity, creep resistance, durability and temperature/chemical resistance may also be used, such as PTFE, polyimide, or high density polyethylene.

Interpretation. References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded. Moreover, the present disclosure also contemplates that in some embodiments, any feature or combination of features set forth herein can be excluded or omitted. To illustrate, if the specification states that a system comprises components A, B, and C, it is specifically intended that any of A, B, and C, or any combination thereof, can be omitted and disclaimed singularly or in any combination. If a component D is separately described, it may be combined with any foregoing combination.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may" and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A hydraulic motor, comprising:

(a) a top sub for connecting to a tubing string, a main barrel and a bottom bit sub;

(b) an impeller housing connected to the top sub and disposed within the main barrel, the impeller housing defining: (i) at least one inlet port for directing fluid, received from an intake plenum, into an impeller chamber, and in a direction substantially transverse to a longitudinal axis of the motor, and (ii) at least one exhaust port for exhausting fluid from the impeller chamber into an annular exhaust plenum, wherein outside of the impeller chamber the at least one inlet port is fluidically isolated from the at least one exhaust port;

(c) an impeller disposed within the impeller chamber and comprising a longitudinal impeller shaft and a hub bearing a plurality of outwardly extending impeller vanes which are positionally and orientationally fixed relative to the hub, wherein fluid directed onto the impeller through the at least one inlet port causes rotation of the impeller; and (d) a bottom bearing assembly for supporting an adapter shaft disposed within the bit sub;

wherein the motor defines a fluid path through the top sub, through the impeller housing and an annular space within the main barrel, and which exits through the adapter shaft and the bit sub, and a gap exists between a distal outward end of one or more impeller vanes, and an inner surface of the impeller housing.

2. The motor of claim 1, wherein the impeller vanes are non-helical.

3. The motor of claim 2, wherein the impeller vanes have an extended end portion forming an impeller bucket.

4. The motor of claim 1 further comprising a gearbox and/or a speed reducer connected to the impeller shaft.

5. The motor of claim 1, wherein the bottom bearing assembly comprises a solid, dry-running bearing.

6. The motor of claim 5 wherein the solid, dry-running bearing comprises a first thrust bearing ring for supporting an upper portion of the adapter shaft, and a second thrust/rotary bearing for supporting a lower portion of the adapter shaft and the bit sub.

7. The motor of claim 1 wherein the impeller housing is a unitary monolithic element which defines an inlet plenum within the main barrel.

8. The motor of claim 1 wherein the at least one inlet port comprises three ports aligned in a longitudinal direction.

9. The motor of claim 1 wherein the combined opening area of the at least one exhaust port from the impeller housing exceeds the combined opening area of the at least one inlet port.

* * * * *